(12) United States Patent
Stewart et al.

(10) Patent No.: US 8,681,096 B2
(45) Date of Patent: Mar. 25, 2014

(54) AUTOMATIC SWITCHING BETWEEN FUNCTIONS EMULATED BY A CLICK PAD DEVICE

(75) Inventors: Aaron Michael Stewart, Raleigh, NC (US); Harriss C. Ganey, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 406 days.

(21) Appl. No.: 12/949,977

(22) Filed: Nov. 19, 2010

(65) Prior Publication Data

US 2012/0127085 A1 May 24, 2012

(51) Int. Cl.
*G06F 3/041* (2006.01)

(52) U.S. Cl.
USPC ........... 345/156; 345/157; 345/158; 345/159; 345/160; 345/161; 345/162; 345/163; 345/164; 345/165; 345/166; 463/36; 463/37; 463/38; 463/39; 178/18.01; 178/18.02; 178/18.03; 178/18.04; 178/18.05; 178/18.06; 178/18.07; 178/18.08; 178/18.09; 178/18.11

(58) Field of Classification Search
USPC .............................. 345/156–184; 463/36–39; 178/18.01–18.09, 18.11
See application file for complete search history.

(56) References Cited

U.S. PATENT DOCUMENTS

| | | | |
|---|---|---|---|
| 2008/0048978 A1* | 2/2008 | Trent et al. ..................... | 345/157 |
| 2008/0048997 A1* | 2/2008 | Gillespie et al. .............. | 345/174 |
| 2008/0297478 A1* | 12/2008 | Hotelling et al. .............. | 345/163 |
| 2010/0283746 A1* | 11/2010 | Vuong et al. .................. | 345/173 |

* cited by examiner

*Primary Examiner* — Alexander S Beck
*Assistant Examiner* — Jeffrey Steinberg
(74) *Attorney, Agent, or Firm* — Ference & Associates LLC (57) ABSTRACT

Touchpad devices emulating button functionality ("click pad" devices) that simultaneously emulates multiple functionalities are described herein. In addition, embodiments provide for click pad emulation of both TrackPoint and touchpad functionality. According to embodiments, a click pad device emulating multiple functionalities may enable or disable certain functionalities based on user interaction with the click pad device. For example, a click pad device emulating both TrackPoint and touchpad functionality may enable TrackPoint functionality and disable touchpad functionality if user gestures on the click pad device indicate that the user is interacting with the click pad as a TrackPoint device.

20 Claims, 5 Drawing Sheets

AUTOMATIC SWITCHING BETWEEN FUNCTIONS EMULATED BY A CLICK PAD DEVICE

BACKGROUND

A wide range of cursor control and pointing device systems for laptop computers are in common use today. Standard examples include trackballs, touchpads, touchscreens, and pointing sticks, each of which have evolved since their initial introduction. For example, the CLICKPAD pointing device sold by Synaptics, Inc. operates like a touchpad, but without the need for separate physical buttons to perform certain gestures, such as left- or right-mouse clicks. Instead, CLICKPAD devices contain internal switches beneath the touchpad surface for performing button click functions, while providing the user a similar feel to pressing a physical button. SYNAPTICS and CLICKPAD are common law or registered trademarks of Synaptics, Inc.

Another example is the UltraNav® device available on the ThinkPad® series of personal computers sold by Lenovo (US) Inc. of Morrisville, N.C. The UltraNav® device consists of TrackPoint® and touchpad devices, each of which is in itself a pointing device. The TrackPoint® device consists of a pointing stick on the keyboard and three click buttons below the keyboard and above the touch pad. The pointing stick and the three click buttons may collectively be referred to as a "pointing stick" device herein. The three buttons typically include a left button for left mouse-click, a right button for right mouse-click, and middle button that provides configurable functionality, which is often a scroll functionality by default. To use the TrackPoint® component, a user typically moves the cursor using the pointing stick with a finger, while selecting one of the three click buttons with the thumb. One advantage of the TrackPoint® configuration is that it allows a user to keep their hands over the keyboard area while providing cursor control and pointing device functionality. UltraNav®, TrackPoint® and ThinkPad® are trademarks of Lenovo, Inc. in the United States, other countries, or both.

The touchpad ordinarily consists of a flat surface area located below the keyboard that provides cursor movement or scrolling functionality. In addition, the touchpad typically consist of two separate click buttons located below the touch pad area that provide right and left mouse-click functions. With the UltraNav® device, both the TrackPoint® and the touch pad may be used together.

BRIEF SUMMARY

In summary, one aspect provides a system comprising: one or more processors; a system memory operatively coupled to the one or more processors, the system memory storing instructions; a touch sensitive surface in communication with the one or more processors, the touch sensitive surface being configured to detect a position of a contacting object; and one or more switches in communication with the one or more processors, the one or more switches being configured to actuate responsive to an object pressing on the touch sensitive surface; wherein the touch sensitive surface comprises a plurality of functional zones; wherein the instructions are configured to selectively enable each of the plurality of functional zones based on the contact position information as detected by the touch sensitive surface.

Another aspect provides a method comprising: providing one or more processors; operatively coupling a system memory to the one or more processors, the system memory storing instructions; configuring a touch sensitive surface to communicate with the one or more processors, the touch sensitive surface being configured to detect a position of a contacting object; and configuring one or more switches to communicate with the one or more processors, the one or more switches being configured to actuate responsive to an object pressing on the touch sensitive surface; wherein the touch sensitive surface comprises a plurality of functional zones; wherein the instructions are configured to selectively enable each of the plurality of functional zones based on the contact position information as detected by the touch sensitive surface.

A further aspect provides a system comprising: a touch sensitive surface configured to detect a position of a contacting object, the touch sensitive surface having a plurality of functional zones; one or more switches configured to actuate responsive to an object pressing on the touch sensitive surface; and wherein each of the plurality of functional zones is selectively enabled based on the contact position information as detected by the touch sensitive surface.

A still further aspect provides a computer program product comprising: a computer readable storage medium having computer readable program code embodied therewith, the computer readable program code comprising: computer readable program code configured to detect the position of a contacting object utilizing a touch sensitive surface, the touch sensitive surface having a plurality of functional zones; computer readable program code configured to actuate one or more switches in responsive to an object pressing on the touch sensitive surface; and computer readable program code configured to configure a functional zone module to communicate with the touch sensitive surface, the functional zone module configured to selectively enable each of the plurality of functional zones based on the contact position information as detected by the touch sensitive surface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

DETAILED DESCRIPTION

It will be readily understood that the components of the embodiments, as generally described and illustrated in the figures herein, may be arranged and designed in a wide variety of different configurations in addition to the described embodiments. Thus, the following more detailed description of the example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the example embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Existing ClickPad devices and touchpad devices emulating button functionality (hereinafter "click pad" devices) have been used to replace separate, physical touchpad buttons. Click pad devices detect user gestures, such as sliding a finger across the touchpad surface, and translate them into operations, such as cursor movement, through various methods. For example, capacitance and conductance sensing may be used to determine whether a user is touching the surface of the touchpad and in what location. Button selection may be emulated through internal switches located below the touchpad surface that detect when a user has pressed down on the touchpad surface. One type of click pad devices use a hinge-type internal button that pivots when pressed by a user in certain areas of the touch pad surface to emulate physical button clicks. Another type is the universal travel click pad device, wherein pressing down anywhere on the touchpad surface lowers the entire plane of the touchpad surface, activating an internal switch.

Although existing click pad devices have been used to emulate physical buttons, they have not been used to replace the physical buttons for computing devices that provide both TrackPoint®, or pointing stick device, and touchpad functionality. Accordingly, the inventors have recognized a need for a click pad device that emulates both TrackPoint® and touchpad functionality on a single computing device.

Providing TrackPoint® and touchpad functionality in a click pad device would require different settings because TrackPoint® and touchpad functional zones and buttons are separate and distinct. For example, TrackPoint® functionality would be located at or near the top of a click pad device, while touchpad functionality would be located generally below the functional zones designated for TrackPoint®. As such, it would be desirable for a click pad emulating both TrackPoint® and touchpad functionality to provide settings specific for TrackPoint® or touchpad based on which functionality the user is using.

Existing technology may provide for activating TrackPoint® or touchpad settings through software or manual control settings. Such settings would only allow users to manually switch click pad device functionality between TrackPoint® and touchpad settings. However, users operating a computing device would not receive the full advantage of a click pad device able to emulate both TrackPoint® and touchpad functionality if they were required to open up a separate software program or access manual control settings each time they needed to change click pad functionality. Accordingly, the inventors have recognized a need for a click pad device that may emulate multiple functionalities, including, but not limited to, TrackPoint® and touchpad functionalities, and enable or disable these functionalities automatically based on user interaction with the click pad device.

Embodiments provide for a click pad device that simultaneously emulates multiple functionalities. In addition, embodiments provide for click pad emulation of both TrackPoint® and touchpad functionality. According to embodiments, a click pad device emulating multiple functionalities may enable or disable certain functionalities based on user interaction with the click pad device. As a non-limiting example, a click pad device emulating both TrackPoint® and touchpad functionality may enable TrackPoint® functionality and disable touchpad functionality if user gestures on the click pad device indicate that the user is interacting with the click pad as a TrackPoint® device.

The description now turns to the figures. The example embodiments will be best understood by reference to the figures, and the scope of the invention will be pointed out in the appended claims.

Figure 1:
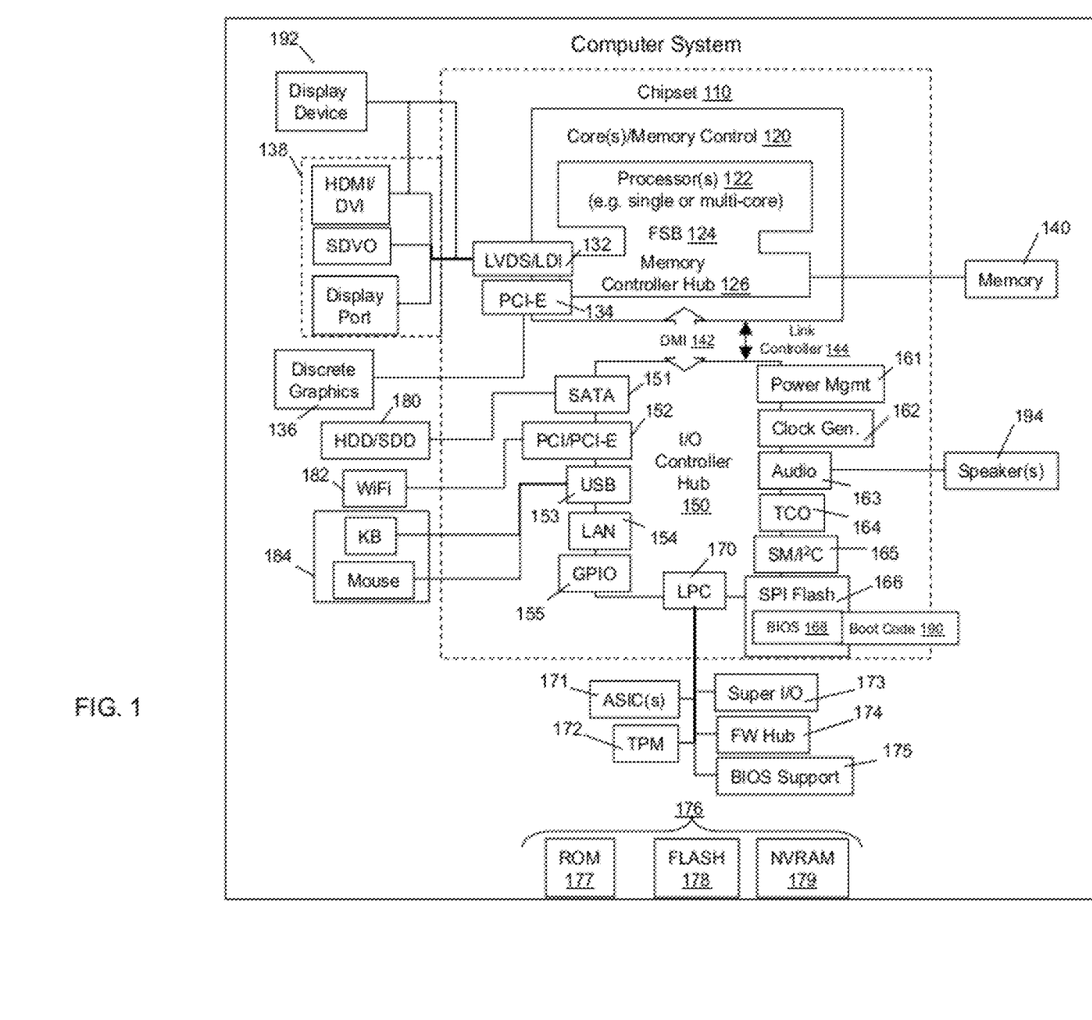
FIG. 1 illustrates an example computing device.

While various other circuits or circuitry may be utilized, FIG. 1 depicts a block diagram of one example of a computer system and circuitry. The system may be a tablet computer system, such as one of the ThinkPad® series of personal computers sold by Lenovo (US) Inc. of Morrisville, N.C.; however, as apparent from the description herein, a client device or other machine may include other features or only some of the features of the system illustrated in FIG. 1.

The computer system of FIG. 1 includes a so-called chipset 110 (a group of integrated circuits, or chips, that work together, chipsets) with an architecture that may vary depending on manufacturer (for example, INTEL®, AMD®, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, et cetera), a PCI-E interface 152 (for example, for wireless connections 182), a USB interface 153 (for example, for input devices 184 such as a digitizer, keyboard, mice, cameras, phones, storage, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
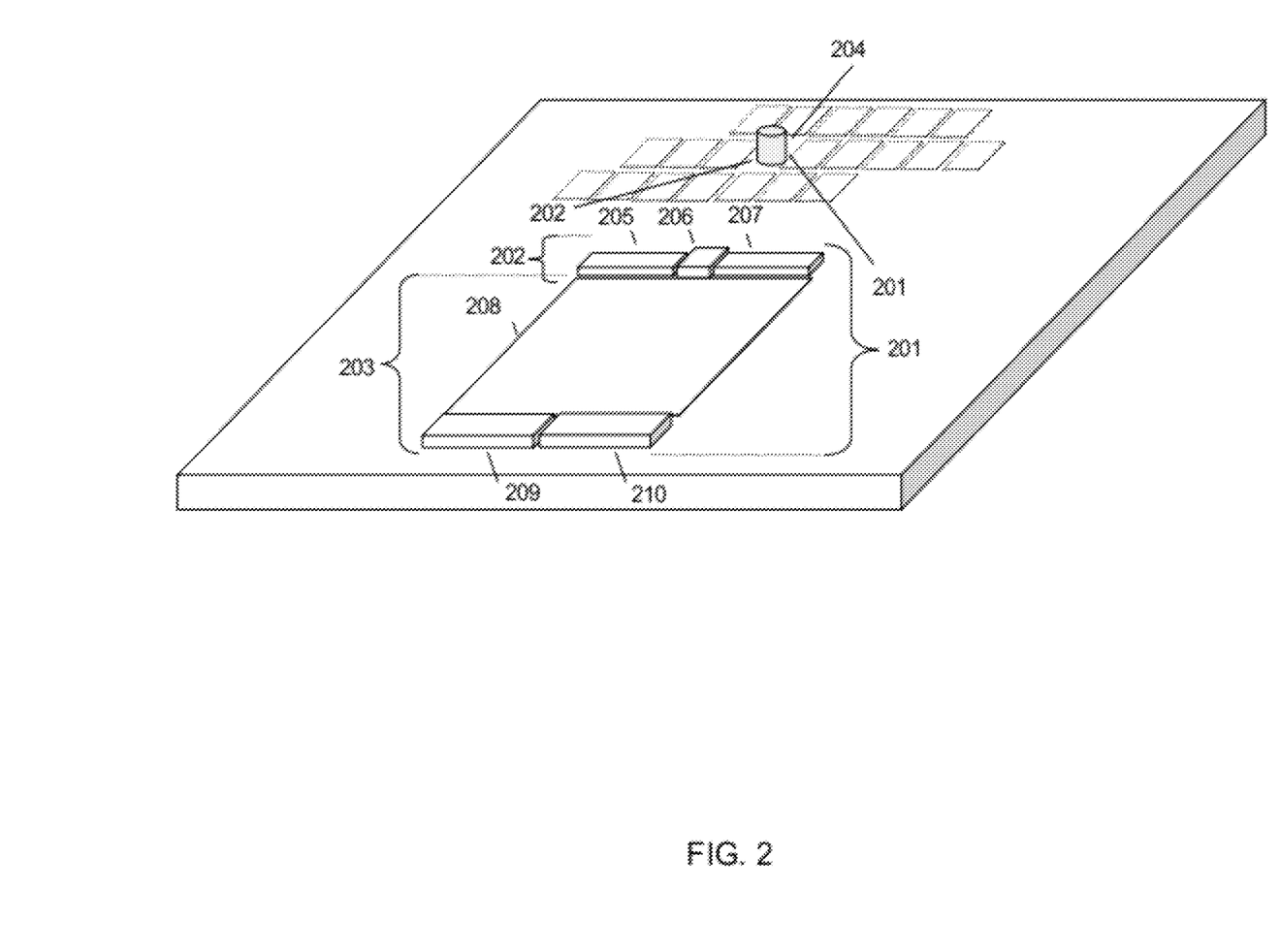
FIG. 2 illustrates an example cursor control and pointing device system comprised of TrackPoint® and touchpad devices.

Referring now to FIG. 2, therein is depicted a cursor control and pointing device system comprised of both TrackPoint® and touchpad devices. The cursor control and pointing device system 201 consists of a TrackPoint® zone 202 and a touchpad zone 203. The TrackPoint® zone 202 contains a pointing stick 204, a left button 205, a middle button 206, and a right button 207. The touchpad zone 203 is comprised of a touchpad 208, a left button 209, and a right button 210. The system illustrated in FIG. 2 is typical of the configuration on a computing device, such as the ThinkPad® series of personal computers, that provides both TrackPoint® and touchpad functionality. On such a computing device, both the TrackPoint® and touchpad functionality may be used simultaneously, or may be enabled or disabled through software or manual settings.

Figure 3:
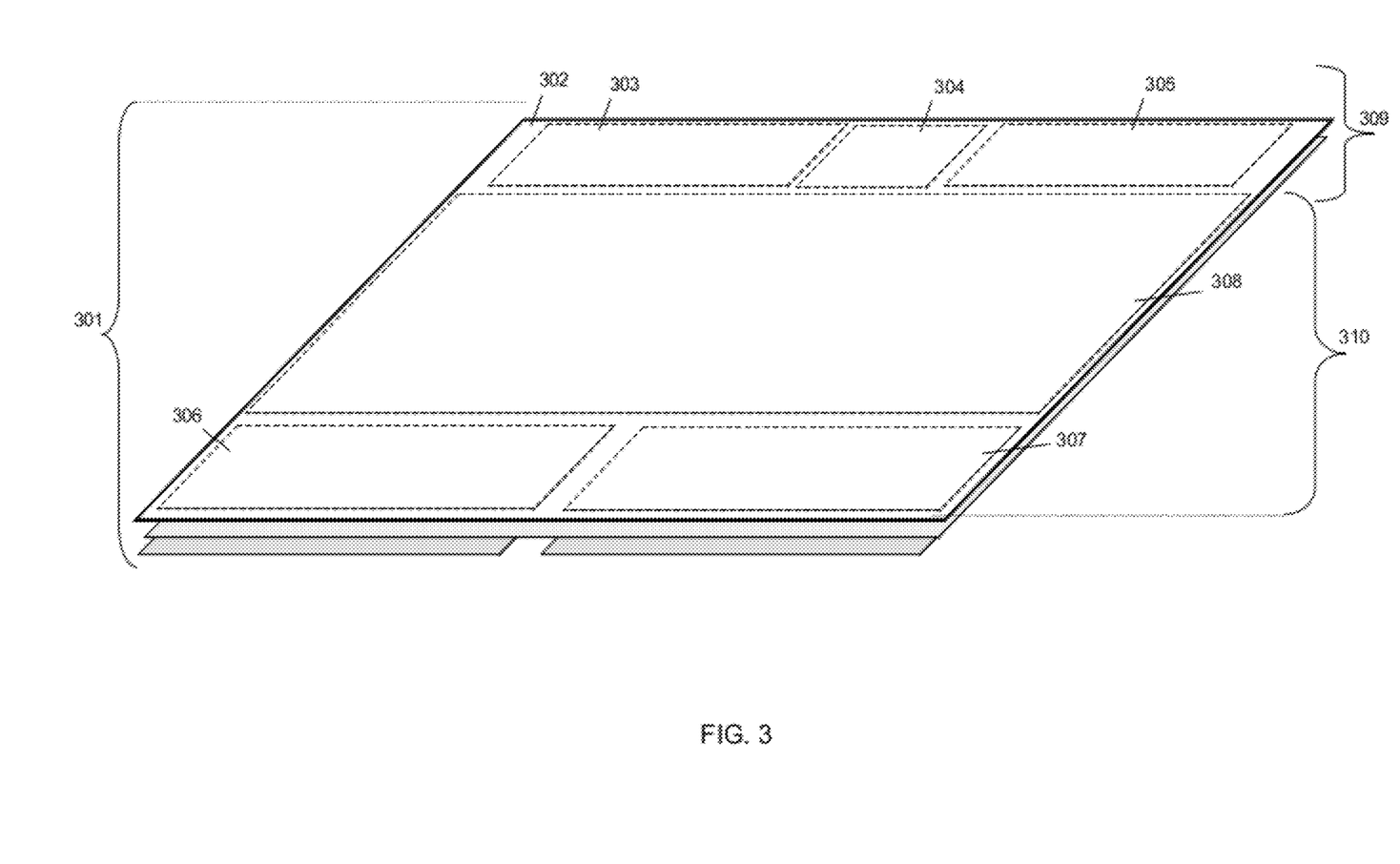
FIG. 3 illustrates an example click pad device emulating both TrackPoint® and touchpad functionalities.

Referring now to FIG. 3, therein is depicted a click pad device emulating both TrackPoint® and touchpad functionalities. The click pad device 301 is comprised of a touchpad surface 302. In addition to conventional touchpad functionality, the touchpad surface 302 of a click pad device also provides click button functionality. As a non-limiting example, pressing down on the touchpad surface activates one or more switches that perform button functionality. As such, a click pad device provides button functionality without the need for physical buttons. The touchpad surface 302 contains certain button zones 303, 304, 305, 306, 307 and a touchpad zone 308. Left TrackPoint® button zone 303, middle TrackPoint® button zone 304, and right TrackPoint® button zone 305 comprise the TrackPoint® area 309 of the touchpad surface 302. User gestures in the TrackPoint® area 309 provide TrackPoint® functionality. Touchpad zone 308, left touchpad button 306, and right touchpad button 307 comprise the touchpad area 310 of the touchpad surface 302. User gestures in the touchpad area 301 provide touchpad functionality.

Figure 4:
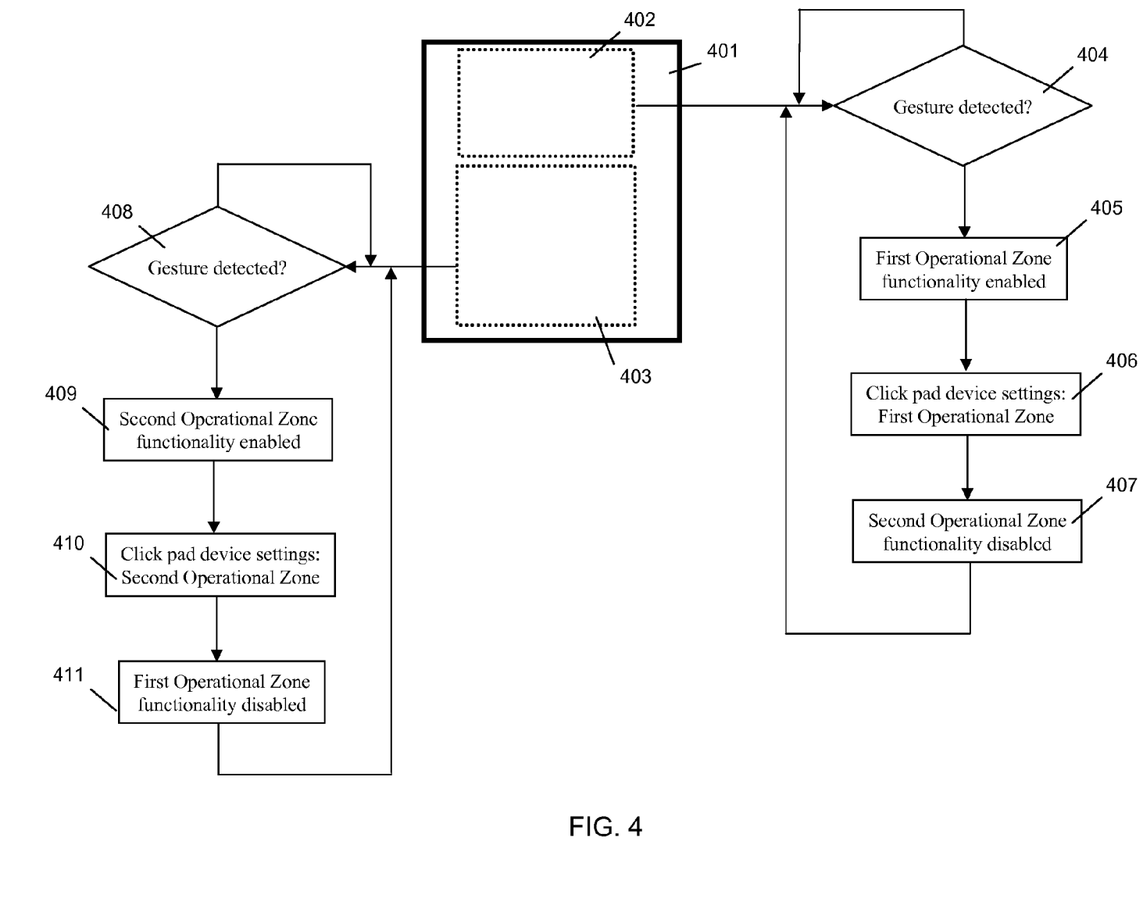
FIG. 4 illustrates automatically determining the operational mode of a click pad device.

Referring now to FIG. 4, therein is depicted a diagram of automatically determining the operational mode of a click pad device according to an embodiment. A click pad device 401 is comprised of a first operational zone 402 and a second operational zone 403. If a user gesture is detected 404 in the first operational zone 402, first operational zone 402 functionality is enabled 405, click pad device settings are set to first operational zone 402 functionality 406, and second operational zone 403 functionality is disabled 407. The click pad device 401 operates with the first operational zone 402 while user gestures are detected in the first operational zone 402.

If a user gesture is detected 408 in the second operational zone 403, second operational zone 403 functionality is enabled 409, click pad device settings are set to second operational zone 403 functionality 410, and first operational zone 402 functionality is disabled 411. The click pad device 401 operates with the second operational zone 403 while user gestures are detected in the second operational zone 403.

A click pad device according to embodiments may have several modes. The following provides non-limiting examples of potential click pad device modes according to embodiments. In a first mode, a click pad device may have no button zones, operating entirely as a touchpad. A second mode may comprise a click pad device emulating a touch pad and two buttons. According to embodiments, the second mode may provide that the two buttons may be located in a zone below the touchpad zone. A third mode may involve a touchpad zone capable of detecting the number of fingers pressing on the touchpad zone and reacting accordingly. As a non-limiting example, presssing on the touchpad zone with one finger elicits a right mouse-click function and pressing with two fingers elicits a left mouse-click function. A fourth mode may provide for three button zones located at or near the top of the click pad device. According to embodiments, in this mode, the left button zone may elicit a left mouse-click function, the middle button zone may elicit a configurable function (for example, scroll), and the right button zone may elicit a right mouse-click function. A fifth mode may provide for three upper button zones located at or near the top of the click pad device, a touchpad zone, and two lower buttons located below the touchpad zone. According to embodiments, in this mode, the three upper button zones provide TrackPoint® functionality, and the touchpad zone and two lower button zones provide touchpad functionality. As described herein, embodiments provide for other modes not specifically described as one of the non-limiting examples of potential click pad device operational modes.

Figure 5:
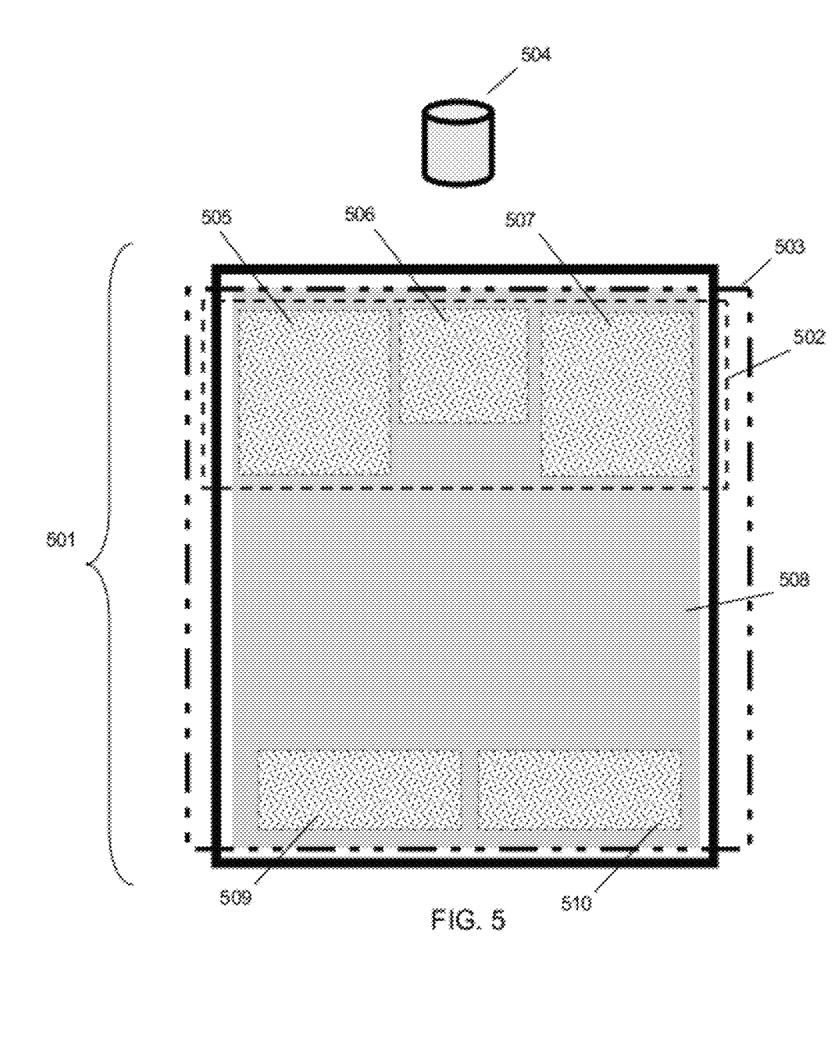
FIG. 5 illustrates another example click pad device emulating both TrackPoint® and touchpad functionalities.

Referring now to FIG. 5, therein is depicted an example embodiment of a click pad device emulating both TrackPoint® and touchpad functionality. The click pad device 501 is comprised of a TrackPoint® zone 502 and a touchpad zone 503. The TrackPoint® zone 502 consists of a right TrackPoint® button zone 505, a middle TrackPoint® button zone 506, and a left TrackPoint® button zone 507. The touchpad zone 502 consists of a touchpad area 508, a left touchpad button zone 509, and a right touchpad button zone 510.

If the TrackPoint® pointing stick 504 or any of the TrackPoint® button zones 505, 506, 507 detect user input, the TrackPoint® zone 502 is enabled and the touchpad zone 502, left touchpad button zone 509, and right touchpad button zone 510 are disabled. Enabling the TrackPoint® zone enables the TrackPoint® zone buttons 505, 506, 507 to operate as a TrackPoint® device. The click pad device 501 may remain in this TrackPoint® state while user gestures continue to be detected within the TrackPoint® zone 502, and for a specified period of time after user gestures stop being detected within the TrackPoint® zone 502. As a non-limiting example, an inactivity period of five seconds may be specified.

If the TrackPoint® zone 502 is not enabled and user gestures are detected in the touchpad zone 503, the touchpad area 508, left touchpad button zone 509, and right touchpad button zone 510 are enabled. In addition, the TrackPoint® zone 502 is disabled for TrackPoint® functionality only. As such, embodiments provide that in this touchpad state, the touchpad area 508 that overlaps with the TrackPoint® zone 502 may be enabled for touchpad functionality. The click pad device 501 may remain in this touchpad state while user gestures continue to be detected within the touchpad zone 503, for a specified period of time after user gestures stop being detected within the touchpad zone 503, or while TrackPoint® functionality has not been activated, such as through use of the TrackPoint® pointing stick 504.

Embodiments provide for a click pad device that emulates multiple functionalities. Embodiments further provide for a click pad device that emulates TrackPoint® and touchpad functionalities. In such embodiments, the click pad device consists of three upper button zones, a touchpad, and two lower button zones located below the touchpad zone. In addition, embodiments provide that the touchpad zone may be located below the three upper button zones, or may overlap with the three upper button zones. The three upper button zones emulate the three buttons typical of a TrackPoint® device. The touchpad zone and two lower buttons emulate the buttons and touchpad typical of a touchpad device. Embodiments provide that the emulated zones may be demarcated on the surface of the click pad device, including, but not limited to, through indentations in the click pad surface or graphical representations, such as dotted lines outlining the different zones. In addition, embodiments provide that the size of the operational zones on the click pad device may be configurable.

According to embodiments, click pad device functions may be automatically enabled when user gestures are detected in particular functional zones. In addition, when a click pad device function is activated, certain click pad device zones are enabled and other zones are disabled. As a non-limiting example, when user gestures are detected in the TrackPoint® zone of the click pad device, the TrackPoint® zone area of the click pad device is enabled and other functional areas of the click pad device, such as touchpad functionality areas, may be disabled. Thus, embodiments eliminate inadvertent and spurious contact with the click pad device when a user is interacting with the click pad through a particular functionality. As a non-limiting example, if a user is interacting with the click pad device as a TrackPoint® device, the touchpad area is disabled such that inadvertent contact with the touchpad area will not result in inadvertent and spurious on-screen action.

It should be understood that many of the functional characteristics of the embodiments described in this specification may be implemented as modules. Modules may include hardware circuits such as one or more processors with memory, programmable logic, and/or discrete components. The hardware circuits may perform hardwired logic functions, execute computer readable programs stored on non-signal storage devices, and/or execute programmed functions. The computer readable programs may in combination with other elements perform the functions of the embodiments.

It will be readily understood by those having ordinary skill in the art that embodiments may take the form of an entirely hardware embodiment or an embodiment containing both hardware and software elements. An embodiment that is implemented in software may include, but is not limited to, firmware, resident software, microcode, etc.

The computer readable programs may be stored any non-signal medium. Examples of a non-signal medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

Accordingly, elements may be implemented on at least one electronic device running suitable software programs. These may also be implemented on at least one Integrated Circuit or part of at least one Integrated Circuit. Thus, it is to be understood that the embodiments may be implemented in a combination of both hardware and software. Again, computer/machine-readable programs may in combination with an electronic device perform the functions of the embodiments.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth example embodiments and, although specific terms are used, the description thus given uses terminology in a generic and descriptive sense only and not for purposes of limitation.

What is claimed is:

1. A system comprising:
one or more processors;
a system memory operatively coupled to the one or more processors, the system memory storing instructions;
a touch sensitive surface in communication with the one or more processors, the touch sensitive surface being configured to detect a position of a contacting object; and
one or more switches in communication with the one or more processors, the one or more switches being configured to actuate responsive to an object pressing on the touch sensitive surface;
wherein the touch sensitive surface comprises a plurality of functional zones;
wherein the instructions are configured to selectively enable each of the plurality of functional zones based on the contact position information as detected by the touch sensitive surface; and
wherein an enabled functional zone remains enabled while the touch sensitive surface detects a contacting object in the enabled functional zone and for a specified duration after the touch sensitive surface stops detecting the contacting object in the enabled functional zone.

2. The system according to claim 1, wherein one or more disabled functional zones remain disabled while the touch sensitive surface detects a contacting object in the enabled functional zone and for a specified duration after the touch sensitive surface stops detecting the contacting object in the enabled functional zone.

3. The system according to claim 1, further comprising:
a pointing stick in communication with the one or more processors;
wherein the plurality of functional zones comprise a pointing stick zone and a touchpad zone;
wherein the pointing stick is communicatively associated with the pointing stick zone.

4. The system according to claim 3, wherein the instructions enable the pointing stick zone responsive to the pointing stick being activated.

5. The system according to claim 3, wherein the touchpad zone encompasses a majority of the touch sensitive surface and the pointing stick zone is located at a top portion of the touch sensitive surface such that the pointing stick zone and the touchpad zone overlap.

6. The system according to claim 3, wherein the pointing stick zone comprises:
a left pointing stick button zone;
a middle pointing stick button zone; and
a right pointing stick button zone.

7. The system according to claim 6, wherein pressing on the touch sensitive surface in the pointing stick zone when the pointing stick zone is enabled actuates the one or more switches to produce location based responses comprising:
pressing on the touch sensitive surface in the left pointing stick button zone produces a left mouse-click response;

pressing on the touch sensitive surface in the middle pointing stick button zone produces a user configured response; and pressing on the touch sensitive surface in the right pointing stick button zone produces a right mouse-click response.

8. The system according to claim 3, wherein the touchpad zone comprises:
a touchpad area;
a left touchpad button zone; and
a right touchpad button zone.

9. The system according to claim 8, wherein contacting the touch sensitive surface in the touchpad zone when the touchpad zone is enabled produces location based responses comprising:

contacting the touch sensitive surface in the touchpad area produces a cursor movement response;

pressing on the touch sensitive surface in the left touchpad button zone produces a left mouse-click response; and pressing on the touch sensitive surface in the right touchpad button zone produces a right mouse-click response.

10. A method comprising:
providing one or more processors;
operatively coupling a system memory to the one or more processors, the system memory storing instructions;
configuring a touch sensitive surface to communicate with the one or more processors, the touch sensitive surface being configured to detect a position of a contacting object; and
configuring one or more switches to communicate with the one or more processors, the one or more switches being configured to actuate responsive to an object pressing on the touch sensitive surface;
wherein the touch sensitive surface comprises a plurality of functional zones;
wherein the instructions are configured to selectively enable each of the plurality of functional zones based on the contact position information as detected by the touch sensitive surface; and
wherein an enabled functional zone remains enabled while the touch sensitive surface detects a contacting object in the enabled functional zone and for a specified duration after the touch sensitive surface stops detecting the contacting object in the enabled functional zone.

11. The method according to claim 10, wherein one or more disabled functional zones remain disabled while the touch sensitive surface detects a contacting object in the enabled functional zone and for a specified duration after the touch sensitive surface stops detecting the contacting object in the enabled functional zone.

12. The method according to claim 10, further comprising:
a pointing stick in communication with the one or more processors;
wherein the plurality of functional zones comprise a pointing stick zone and a touchpad zone;
wherein the pointing stick is communicatively associated with the pointing stick zone.

13. The method according to claim 12, wherein the instructions enable the pointing stick zone responsive to the pointing stick being activated.

14. A system comprising:
a touch sensitive surface configured to detect a position of a contacting object, the touch sensitive surface having a plurality of functional zones;

one or more switches configured to actuate responsive to an object pressing on the touch sensitive surface; and wherein each of the plurality of functional zones is selectively enabled based on the contact position information as detected by the touch sensitive surface; and wherein an enabled functional zone remains enabled while the touch sensitive surface detects a contacting object in the enabled functional zone and for a specified duration after the touch sensitive surface stops detecting the contacting object in the enabled functional zone.

15. The system according to claim 14, wherein one or more disabled functional zones remain disabled while the touch sensitive surface detects a contacting object in the enabled functional zone and for a specified duration after the touch sensitive surface stops detecting the contacting object in the enabled functional zone.

16. The system according to claim 14, further comprising:
a pointing stick;
wherein the plurality of functional zones comprise a pointing stick zone and a touchpad zone;
wherein the pointing stick is communicatively associated with the pointing stick zone.

17. The system according to claim 14, wherein the pointing stick zone is enabled responsive to the pointing stick being activated.

18. A computer program product comprising:
a computer readable storage device having computer readable program code embodied therewith, the computer readable program code comprising:
computer readable program code configured to detect the position of a contacting object utilizing a touch sensitive surface, the touch sensitive surface having a plurality of functional zones;
computer readable program code configured to actuate one or more switches in responsive to an object pressing on the touch sensitive surface; and
computer readable program code configured to configure a functional zone module to communicate with the touch sensitive surface, the functional zone module configured to selectively enable each of the plurality of functional zones based on the contact position information as detected by the touch sensitive surface; and
wherein an enabled functional zone remains enabled while the touch sensitive surface detects a contacting object in the enabled functional zone and for a specified duration after the touch sensitive surface stops detecting the contacting object in the enabled functional zone.

19. The computer program product according to claim 18, wherein one or more disabled functional zones remain disabled while the touch sensitive surface detects a contacting object in the enabled functional zone and for a specified duration after the touch sensitive surface stops detecting the contacting object in the enabled functional zone.

20. The computer program product according to claim 18, further comprising:
a pointing stick;
wherein the plurality of functional zones comprise a pointing stick zone and a touchpad zone;
wherein the pointing stick is communicatively associated with the pointing stick zone.

* * * * *